United States Patent [19]

Carenco et al.

[11] Patent Number: 4,767,174

[45] Date of Patent: Aug. 30, 1988

[54] PROCESS AND DEVICE FOR CONNECTING AN OPTICAL FIBRE AND AN INTEGRATED OPTICAL COMPONENT COMPRISING A WAVE GUIDE

[75] Inventors: Alain Carenco, Bourg la Reine; Luc Riviere, Meudon, both of France

[73] Assignee: L'Etat Francais represente par le Ministre des P.TT., Issy Les Moulineaux, France

[21] Appl. No.: 21,541

[22] Filed: Feb. 27, 1987

Related U.S. Application Data

[63] Continuation of Ser. No. 610,615, May 16, 1984, abandoned.

[30] Foreign Application Priority Data

May 17, 1983 [FR] France ................... 83 08141

[51] Int. Cl.⁴ .................. G02B 6/36; H01L 39/02; B65H 69/02
[52] U.S. Cl. .................. 350/96.20; 350/96.17; 350/320; 357/80; 156/158
[58] Field of Search ............ 350/96.10, 96.11, 96.12, 350/96.15, 96.17, 96.20, 320; 250/227; 156/158, 160; 357/19, 80

[56] References Cited

U.S. PATENT DOCUMENTS

| | | | |
|---|---|---|---|
| 4,065,203 | 12/1977 | Goell et al. | 350/96.15 X |
| 4,079,404 | 3/1978 | Comerford et al. | 350/96.11 X |
| 4,164,363 | 8/1979 | Hsu | 350/96.17 |
| 4,237,474 | 12/1980 | Ladany | 350/96.20 X |
| 4,268,113 | 5/1981 | Noel, Jr. | 350/96.20 |
| 4,479,698 | 10/1984 | Landis et al. | 350/96.20 |
| 4,523,810 | 6/1985 | Goss et al. | 350/320 |
| 4,623,220 | 11/1986 | Grabbe et al. | 350/96.20 |
| 4,647,147 | 3/1987 | Pikulski et al. | 350/96.17 |
| 4,664,732 | 5/1987 | Campbell et al. | 156/158 |
| 4,701,013 | 10/1987 | Jurczyszyn et al. | 350/320 |
| 4,702,556 | 10/1987 | Ishii et al. | 350/320 |
| 4,708,429 | 11/1987 | Clark et al. | 350/96.20 |
| 4,714,315 | 12/1987 | Krause | 350/96.20 |
| 4,720,163 | 1/1988 | Goodwin et al. | 350/96.20 |

FOREIGN PATENT DOCUMENTS

| | | | |
|---|---|---|---|
| 2322383 | 3/1977 | France | 350/96.22 |
| 2497362 | 2/1982 | France | 350/96.17 |
| 54-155850 | 12/1979 | Japan | 350/96.20 |
| WO82/03922 | 11/1982 | PCT Int'l Appl. | 350/96.21 |

OTHER PUBLICATIONS

Bailey et al., "Method and Apparatus to Align and Affix an Optical Fiber and Laser or L.E.D.", Xerox Discl. Jour., vol. 4, No. 3, May/Jun. 1979, pp. 387–388.
Abstract of Japanese Patent 57 29 022 (Fujitsu KK).
Abstract of Japanese Patent 54155850 (Nippon Denshin Kosha).
Abstract of Japanese Patent 54113348 (Nippon Denshin Denwa Kosha).

*Primary Examiner*—William L. Sikes
*Assistant Examiner*—Brian M. Healy
*Attorney, Agent, or Firm*—Pearne, Gordon, McCoy & Granger

[57] ABSTRACT

A process and device for connecting an optical fibre and an integrated optical component comprising a wave guide. The fibre and the component each have an end adapted for connection. The component is attached to a main support. The fibre is attached to a fibre support so that the end of the fibre extends beyond such fibre support. The end of the fibre is attached to the end of the component so as to allow light to pass from the fibre to the component and conversely. Then the fibre support and the main support are rigidly connected to each other.

12 Claims, 3 Drawing Sheets

PROCESS AND DEVICE FOR CONNECTING AN OPTICAL FIBRE AND AN INTEGRATED OPTICAL COMPONENT COMPRISING A WAVE GUIDE

This is a continuation of application Ser. No. 610,615, filed on May 16, 1984, now abandoned.

BACKGROUND OF THE INVENTION

The invention relates to a process and device for connecting at least one optical fibre and an integrated optical component comprising at least one wave guide. The invention applies more particularly to the production of optical communication systems.

Numerous integrated optical components are known. The majority of them comprise bidimensional wave guides, so as to obtain the optimum confinement of light over a suitable length. When such components are to be inserted in optical circuits, for example, circuits for transmission, signal processing or the acquisition of physical parameters, it is important to connect the wave guides, which can be single-mode or multi-mode wave guides, with the minimum loss to the optical fibres comprising such circuits.

A technique is also known for connecting an optical fibre to a wave guide of an integrated optical component. The technique consists in first retaining the fibre in a support so that the fibre can be more readily manipulated. The support can be a metal tube, a silicon plate previously engraved so that it contains V-shaped furrows, or a moulded, for example, plastics support. The fibre is then moved close to the guide by means of micromanipulators. For this purpose two methods are used:

The first method is known as the "flip-flop" method. It can be used only for flat components without electrodes or without impedance adaptation plates. Moreover, the alignment of the optical fibre with the wave guide means that the plate carrying the wave guide must be made from a transparent material, and the plate must be polished on both surfaces.

In the second method the fibre support is attached to a support rigidly connected to the wave guide support by means of a glue. This second method comes up against the problem of the shrinkage of the glue. In practice moreover the correct mechanical behaviour of the fibre adjacent the wave guide requires the assembly formed by the fibre and its support to be so polished that the end of the fibre is flush with the edge of the support. If a number of optical fibres mounted on the same support must be connected respectively to wave guides also disposed on the same support, the second method certainly has the advantage of allowing a collective connection, but it also has the disadvantage of not allowing the correction of faults in the initial positioning of the fibres in their support, or de-centering faults in the cores of the optical fibres.

PROBLEM OF THE INVENTION

The invention relates precisely to a process and device for connecting at least one optical fibre and an integrated optical component comprising at least one wave guide, the method being free from the disadvantages of the aforementioned to the invention require no flat or transparent integrated optical components; by means of a very simple and static assembly they enable any glue shrinkage problem to be avoided; they obviate the polishing of the assembly formed by the fibre and its support and, finally, if a number of fibres disposed on the same support must be connected to wave guides also disposed on the same support, the process and device according to the invention allows corrections of initial positioning faults of the fibres in their support or de-centering faults of the cores of the fibres.

BRIEF STATEMENT OF THE INVENTION

More precisely, the invention relates to a process for connecting at least one optical fibre and an integrated optical component comprising at least one wave guide, the optical fibre and the wave guide each having an end adapted for connection, wherein it consists in:
  attaching the component to a main support,
  attaching the fibre to a fibre support so that the end of the fibre extends beyond such fibre support,
  attaching the end of the fibre to the end of the component so as to enable light to pass from the fibre to the component and conversely, and then
  rigidly connecting to one another the fibre support and the main support.

The term "component" refers not only to a wave guide of the kind used in the field of integrated optics, such as, for example, wave guides formed by a propagaton channel diffused in a substrate, but also to another optical fibre.

According to a preferred feature of the process according to the invention the end of the optical fibre is attached to the end of the wave guide by mean of a light-transparent glue.

Preferably, the optical fibre and the wave guide having different refractive indices, a glue is used whose refractive index lies between the refractive index of the fibre and the refractive index of the wave guide, and is in any case better than the refractive index of air.

According to a special feature of the process according to the invention the glue is also a polymerizable glue.

According to another special feature of the invention the glue adapted to attach the end of the fibre to the end of the wave guide is also a glue which can be polymerized by means of a radiation and is polymerized by aiming the radiation at the glue via a sighting telescope focused on such ends, the ends being brought together and connected by the glue, while the telescope enables the relative positioning of the ends to be controlled beforehand.

According to another special feature of the invention, the fibre support is rigidly connected to the main support by a polymerizable glue, and the glue adapted to attach the end of the fibre to the end of the wave guide is polymerized before the glue adapted to connect the fibre support rigidly to the main support, while avoiding any polymerization of the last-mentioned glue.

According to another special feature of the invention, the glue adapted to connect the fibre support and the main support rigidly to one another is a glue which can be polymerized by a radiation, the fibre support comprises a member adapted to at least partially transmit the radiation provided to polymerize the glue adapted to connect the fibre support and the main support rigidly to one another, and the last-mentioned glue is so disposed between such member for partially transmitting the radiation and the main support as to connect these last-mentioned members rigidly to one another, the last-mentioned glue being polymerized by transmitting to it the corresponding radiation via the member adapted to transmit the radiation.

The glue adapted to connect the fibre support and the main support rigidly to one another can be masked to avoid polymerization while the glue adapted to attach the end of the fibre and the end of the wave guide is polymerized. To perform one polymerization before the other, use can also be made of the sighting telescope already mentioned, which allows selective polymerization.

According to another preferred feature of the process according to the invention, before being attached to one another the end of the fibre and the end of the wave guide are so positioned in relation to one another that a maximum of light passes from the fibre to the wave guide or conversely.

The invention also relates to a device for connecting at least one optical fibre and an integrated optical component comprising at least one wave guide, the optical fibre and the wave guide each having an end adapted for connection, wherein the device comprises a main support to which the component is attached, and a fibre support to which the fibre is attached, so that the end of the latter extends beyond the fibre support, and the fibre support is rigidly connected to the main support, the end of the fibre being previously attached to the end of the wave guide so as to enable light to pass from the fibre to the wave guide and conversely.

Of course, according to the invention an optical fibre may have to be connected to a wave guide, or a certain number of optical fibres to the same number of wave guides, each fibre being respectively connected to a wave guide. The fibres can in that case be disposed on the same support, the wave guides also being disposed on the same support.

BRIEF DESCRIPTION OF THE DRAWINGS

The invention will be more clearly understood from the following description of the exemplary, non-limitative embodiments thereof, with reference to the accompanying drawings, wherein.

DESCRIPTION OF THE PREFERRED EMBODIMENT

Figure 1:
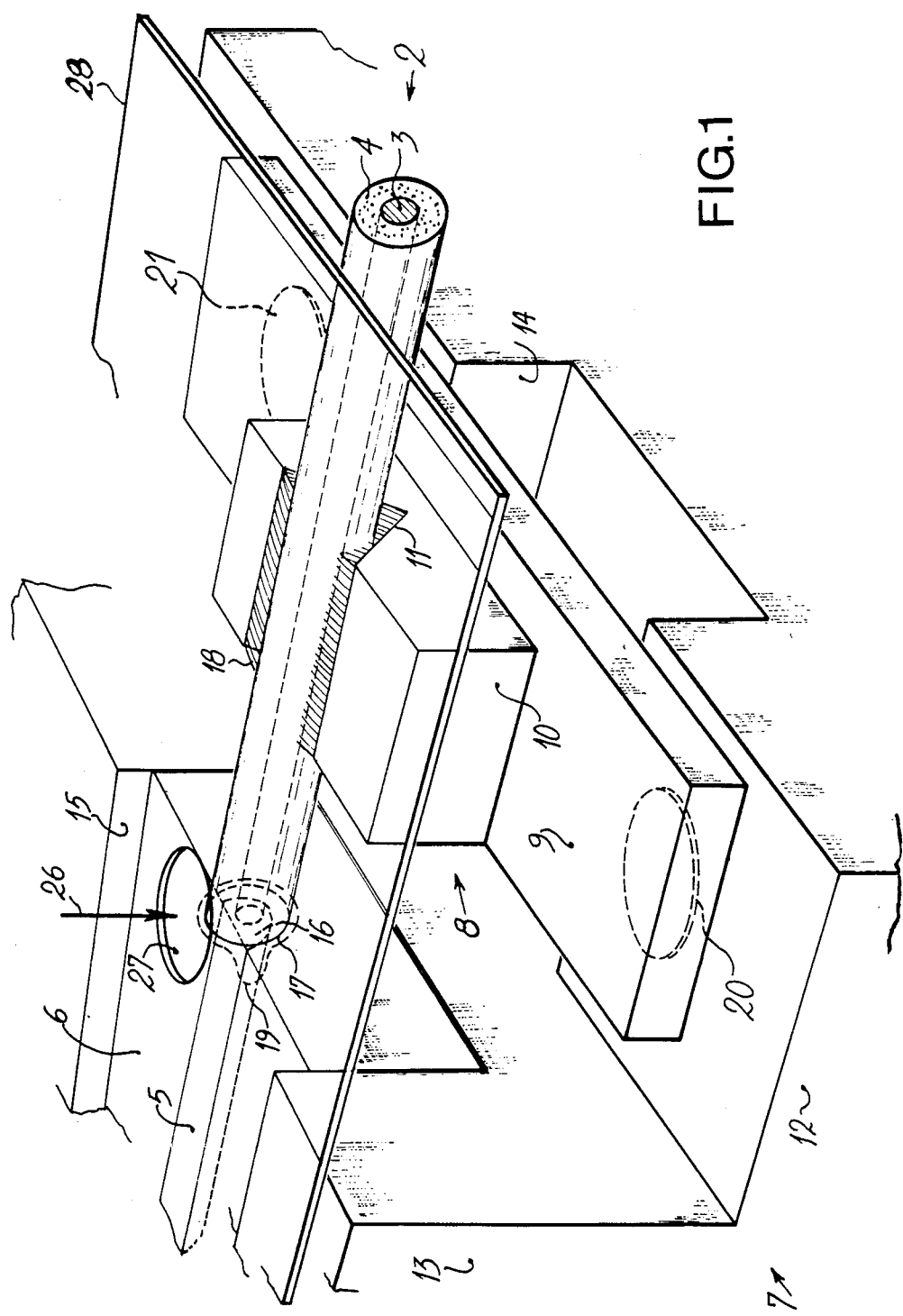
FIG. 1 is a diagrammatic perspective view of a particular embodiment of the device according to the invention

FIG. 1 is a diagrammatic perspective view of a special embodiment of the device according to the invention. It enables an optical fibre 2, comprising in known manner a core 3 and a sheath 4, to be connected to a wave guide 5 of an integrated optical component 6. The wave guide consists, for example, of a light-propagating channel produced by the diffusion of a ribbon of titanium in an $LiNbO_3$ substrate in the form of a plate, forming part of such component.

The device basically comprises a main support 7, for example, of brass, and a fibre support 8 formed by a transparent member 9, such as a small plate of glass, to which a, for example, silicon, parallelepipedic carrying element 10 is glued, in which chemical attack has produced a V-shaped furrow 11, such shape resulting from the ansiotropy of the chemical attack.

The main support 7 comprises a first portion 12 and a second portion 13 which is raised above the first portion. A first groove 14 and a second groove 15 are formed opposite one another in the first portion 12 and the second portion 13, from the surface of the last-mentioned portions and with the same orientation. The component 6 is attached in a second groove 15 provided for this purpose, so that the wave guide 5 has such orientation and the end 16 of the wave guide 5, which is adapted to be connected to an end 17 of the fibre 2, is turned towards the first portion 12. The relative height of the two portions 12 and 13 is such that, once the fibre is attached in the furrow 11 and the plate is attached by glue to the supposedly flat surface of the first portion 12, the fibre is at the level of the wave guide once the glue is dry, using a very thin glue layer so as to limit its shrinkage. The plate 9 is attached to the surface of the first portion 12 above the first groove 14, enabling the plate to be manipulated before it is attached, and in a way such that the furrow 11 is in the prolongation of the wave guide 5. The fibre 2 is so attached in the furrow 11 that its end 17, adapted to be connected to the wave guide, extends beyond the element 10 and the plate 9 and is disposed adjacent the end 16 of the wave guide, being attached to such end 16 so that its core 3 is effectively opposite such end 16.

Figure 2:
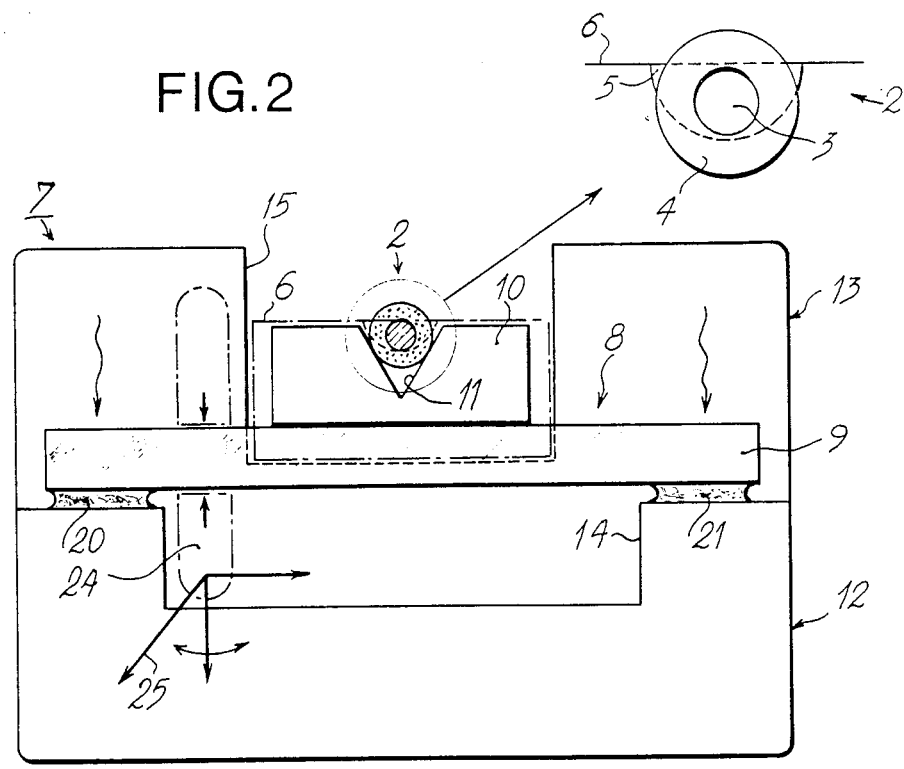
FIG. 2 is a diagrammatic front view of the device

The process according to the invention, enabling the device illustrated in FIG. 1 to be put into effect, is then as follows: the fibre 2 is previously attached in the furrow 11 by means of a glue layer 18, for example, the end 17 of the fibre 2 extending by several millimetres, for example, 5 mm, beyond the edge of the glass plate 9. The component 6 is glued in its groove 15 in the manner indicated above. The end 17 of the fibre is coated with a layer 19 of polymerizable glue by means of an ultraviolet radiation, for example, a layer of the glue commercially available under the Trade Mark NORDLAND 16. (This kind of glue is transparent to the infrared radiation to be propagated by the fibre and the wave guide). The polymerizable glue is retained on such end by capillarity. Two spots 20 and 21 of the polymerizable glue are respectively applied to the surface of the first portion 12 of the main support 7, on either side of the first groove 14. Once it has been aligned in relation to the wave guide 5, the fibre 2 is brought into contact by its end 17 with the end 16 of the wave guide 5, so that the core 3 of the fibre is precisely in contact with the end 16 of the wave guide 5 (FIG. 2). The plate 9 is placed on the first portion 12, the lower part of the plate therefore lightly touching the glue spots 20 and 21 on such first portion 12. The relative height of the two portions 12 and 13 is such that the two glue spots 20 and 21 then form rather thin layers, for example, of the order of 250 $\mu m$.

Figure 3:
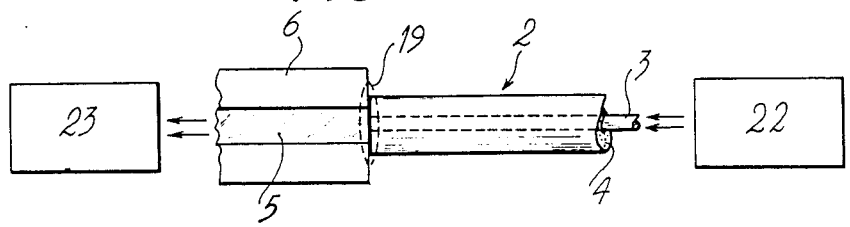
FIG. 3 is a diagrammatic view of an installation allowing the control of the relative positioning of the fibre and the wave guide to be connected to one another

The relative positioning of the ends 16 and 17 of the fibre and the wave guide is performed by means of the plate 9, which is trapped in clamping means 24 (FIG. 2) conencted rigidly to means for microdisplacement in the three directions of space and if necessary at an angle, these being indicated by arrows 25 in FIG. 2. Action is taken on such means of microdisplacement so that the maximum light passes from the fibre to the wave guide or conversely, such light being, for example, injected into the fibre 2 from a light source 22 (FIG. 3) and transmitted from the wave guide 5 to a photodetector 23 in a manner known in the art.

When the relative positioning of the ends 16 and 17 is optimized, the polymerization of the glue layer 19 connecting the ends 16 and 17 is performed by transmitting an ultraviolet radiation 26 to the glue layer 19 from a source of ultraviolet radiation (not shown) and via an aperture 27 made in a mask 28 opaque to ultraviolet radiation and provided to prevent the polymerizaton of the glue spots 20 and 21. The end 17 of the fibre being thus fixed, the mask 23 is removed and the glue spots 20 and 21 polymerized by transmitting to the latter the ultraviolet radiation via the plate of glass 9 and perpendicularly thereto (FIG. 2). The clamping means 24 can then be removed.

The distance between the glue spots 20 and 21 and the distance between each of the spots and the glue layer 19 connecting the ends 16 and 17 of the fibre and the wave guide are adequate for the shrinkage of the glue at the points 20 and 21; in any case, such shrinkage is not very great, given the thinness of the glue, and has practically no influence on the connection between the fibre and the wave guide, the fibre being able to bend to some extent in its portion which extends beyond its support 9.

Moreover, since the glue layer 19, which is thin, the fibre and the wave guide are very close to one another, the losses of light by reflection (and by diffusion in the case of poor polishing or cleavage of the fibre and/or the wave guide) at the interface of the two ends 16 and 17 can be minimized. The glue layer 19 also enables any subsequent pollution of the ends 16 and 17 to be avoided.

Instead of being attached to the carrying element 10, the optical fibre 2 might be attached directly to the glass plate 9.

Figure 4:
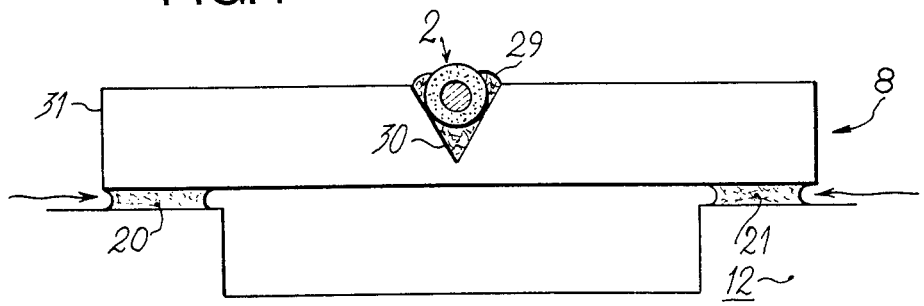
FIG. 4 is a diagrammatic view of another special embodiment of the device according to the invention and FIG. 5 is a diagrammatic view of another special embodiment of the device according to the invention, comprising a certain number of optical fibres and the same number of wave guides, the fibres being respectively connected to the wave guides.

In another embodiment of the invention, the fibre 2 is attached by a glue layer 29 (FIG. 4) in a furrow 30 made in a silicon plate 31 which then forms a fibre support 8. Like the glass plate 9, the plate 31 is attached to the first portion 12 of the main support 7 by means of two glue spots 20 and 21 which are in this case polymerized by ultraviolet radiations transmitted to skim the glue spots 20 and 21, in view of the opacity of silicon to such radiations.

Figure 5:
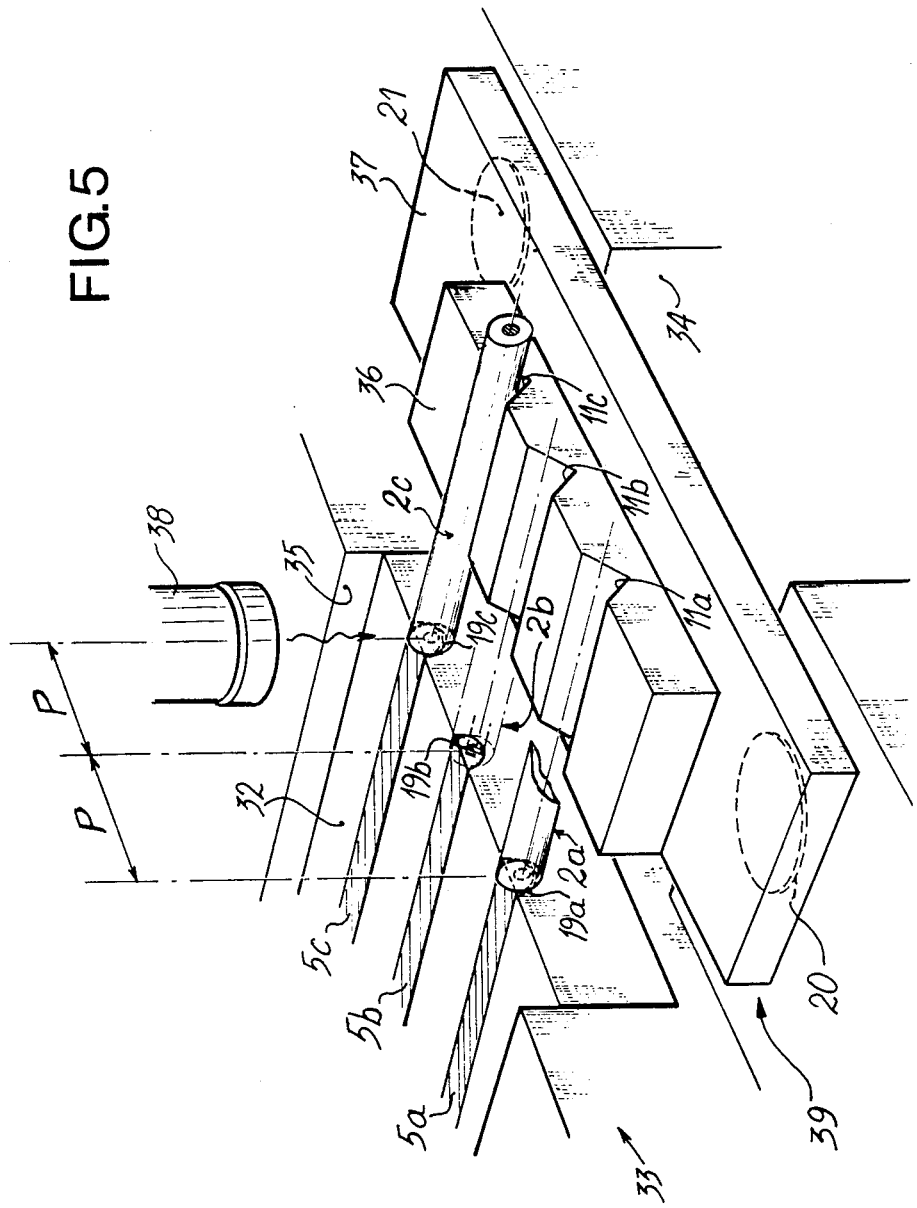

FIG. 5 shows diagrammatically another embodiment of the invention in which a number of fibres 2a, 2b and 2c, (for example, three) are connected respectively to wave guides 5a, 5b, 5c. The latter form parallel, for example, equidistant channels with a pitch P over a substrate forming part of an integrated optical component 32. Use is made of a main support 33 constructed in the same way as the main support 7 described with reference to FIG. 1 and having two grooves 34 and 35. The component 32 is attached in the groove 35. The fibres 2a,2b,2c are attached respectively in parallel, equidistant furrows 11a,11b,11c with such pitch P. These furrows are produced in a silicon plate 36 attached to a glass plate 37, the assembly of the two plates forming a fibre support 39. The glass plae 37 is attached above the groove 34 on the main support 33 by means of two glue spots 20 and 21 disposed on either side of the groove 34. The relative arrangement of the constituents of the device shown in FIG. 5 is identical with the relative arrangement of the constituents of the device illustrated in FIG. 1. The fibres 2a, 2b,2c extend beyond the plates 36 and 37 and are respectively attached by their connecting ends to the connecting ends of the wave guides 5a,5b,5c by means of glue layers 19a,19b,19c respectively interposed between such ends.

The embodiment of the device shown in FIG. 5 is comparable with that of the device illustrated in FIG. 1. The fibres are attached in their respective furrows and the plates 36 and 37 are attached to one another. The glue which can be polymerized by an ultraviolet radiation is then disposed at the ends of the fibres and at the two points 20 and 21 of the main support 33.

Then, in a first method of operation, the fibres 2a,2b,2c are simultaneously attached to the wave guides 5a,5b,5c by simultaneously polymerizing the glue layers 19a,19b,19c, whereafter the glue spots 20 and 21 are polymerized so as to attach the plate 37 to the main support 33.

In a second method of operation, the fibres are attached one after the other to the wave guides, by successively polymerizing the glue layers 19a,19b,19c, whereafter the glue spots 20 and 21 are polymerized so as to attach the plate 37 to the main support 33. This second method of operation is particularly advantageous when the tolerances in the positioning of the fibres in relation to the wave guides are low, more particularly in the case of fibres and single-mode wave guides.

A suitably perforated mask opaque to ultraviolet radiation can be used for polymerizing the glue layers 19a,19b,19c simultaneously, without polymerizing the glue spots 20 and 21.

Similarly, the mask opaque to ultraviolet radiation and suitably perforated can be used for polymerizing a given glue layer 19a or 19b or 19c without polymerizing the other ones or the glues spots 20, 21, so that the ultraviolet radiation reaches only the layer in question. Instead of masking, use can be made of a sighting telescope 38. The latter first of all enables a given fibre to be positioned correctly in relation to the corresponding wave guide, by focussing on the corresponding glue layer so as to observe the latter and enable positioning to be performed correctly. Then the ultraviolet radiation is transmitted to such glue layer via the sighting telescope 38 focused on such layer. The operations of focusing and irradiation by ultraviolet radiation are repeated for each of the other layers. The sighting telescope 38 thus forms an advantageous means of selectively polymerizing the glue.

What we claim is:

1. A process for connecting at least one optical fibre and an integrated optical component comprising at least one wave guide, the optical fibre and the wave guide each having an end adapted for connection, wherein it comprises in:

attaching the component to a main support, attaching in a non-detachable way the fibre to a fibre support so that the end of the fibre extends beyond such fibre support, attaching the end of the fibre to the end of the wave guide so as to enable light to pass from the fibre to the wave guide and conversely, and then rigidly connecting to one another the fibre support and the main support.

2. A process according to claim 1, wherein the end of the optical fibre is attached to the end of the wave guide by means of a glue which is transparent to said light.

3. A process according to claim 2, wherein the glue is also a polymerizable glue.

4. A process according to claim 2, wherein the glue intended for attaching the end of the fibre to the end of the wave guide is also a glue which can be polymerized by means of a radiation and is polymerized by aiming the radiation at the glue via a sighting telescope focussed on such ends, the ends being brought together and connected by the glue, while the telescope enables the relative positioning of the ends to be controlled beforehand.

5. A process according to claim 3, wherein the fibre support is rigidly connected to the main support by a polymerizable glue, and the glue intended for attaching the end of the fibre to the end of the wave guide is polymerized before the glue adapted to connect the fibre support rigidly to the main support, while avoiding any polymerization of the last-mentioned glue.

6. A process according to claim 5, wherein the glue intended for connecting the fibre support and the main support rigidly to one another is a glue which can be polymerized by a radiation, the fibre support comprising a member adapted to at least partially transmit the radiation provided to polymerize the glue intended for connecting the fibre support and the main support rigidly to one another, and the last-mentioned glue is so disposed between such member for partially transmitting the radiation and the main support as to connect these last-mentioned members rigidly to one another, the last-mentioned glue being polymerized by transmitting to it the corresponding radiation via the member adapted to transmit the radiation.

7. A process according to claim 1, wherein before being attached to one another the end of the fibre and the end of the wave guide are so positioned in relation to one another that a maximum of light passes from the fibre to the wave guide or conversely.

8. A device for connecting at least one optical fibre and an integrated optical component comprising at least one wave guide, the optical fibre and the wave guide each having an end intended for connection, wherein the device comprises a main support to which the component is attached, and a fibre support to which the fibre is attached, so that the end of the latter extends beyond the fibre support, and the fibre support is rigidly connected to the main support, the end of the fibre being previously attached to the end of the wave guide so as to enable light to pass from the fibre to the wave guide and conversely.

9. A device according to claim 8 wherein the end of the optical fibre is attached to the end of the wave guide by means of a light-transparent glue.

10. A device according to claim 8 wherein the fibre support is rigidly connected to the main support by means of a glue which can be polymerized by a radiation, the fibre support comprises a member adapted to at least partially transmit the radiation provided to polymerize the glue intended for connecting the fibre support and the main support rigidly to one another, and the last-mentioned glue is disposed between such member adapted to transmit radiation and the main support, the last-mentioned glue being polymerized by transmitting to it the corresponding radiation via the radiation-transmitting member.

11. A process according to claim 4, wherein the fibre support is rigidly connected to the main support by a polymerizable glue, and the glue adapted to attach the end of the fibre to the end of the wave guide is polymerized before the glue is adapted to connect the fibre support rigidly to the main support, while avoiding any polymerization of the last mentioned glue.

12. A process according to claim 11, wherein the glue intended for connecting the fibre support and the main support rigidly to one another is a glue which can be polymerized by a radiation, the fibre support comprising a member adapted to at least partially transmit the radiation provided to polymerize the glue intended for connecting the fibre support and the main support rigidly to one another, and the last-mentioned glue is so disposed between such member for partially transmitting the radiation and the main support as to connect these last-mentioned members rigidly to one another, the last-mentioned glue being polymerized by transmitting to it the corresponding radiation via the member adapted to transmit the radiation.

* * * * *